US005428697A

United States Patent [19]

Dolfi et al.

[11] Patent Number: 5,428,697

[45] Date of Patent: Jun. 27, 1995

[54] DEVICE FOR THE OPTICAL PROCESSING OF ELECTRICAL SIGNALS

[75] Inventors: Daniel Dolfi, Orsay; Jean-Pierre Huignard; Jean Chazelas, both of Paris; Philippe Souchay, Issy Les Moulineaux, all of France

[73] Assignee: Thomson-CSF, Paris, France

[21] Appl. No.: 166,885

[22] Filed: Dec. 15, 1993

[30] Foreign Application Priority Data

Dec. 15, 1992 [FR] France ................................ 92 15085

[51] Int. Cl.[6] ................................................ G02B 6/28

[52] U.S. Cl. ........................................ 385/24; 385/27; 385/37; 385/36; 385/4; 359/245; 250/226

[58] Field of Search ..................... 385/24, 1, 4, 10, 27, 385/37, 36; 359/245, 259; 250/226, 216, 227.11; 356/326, 328

[56] References Cited

U.S. PATENT DOCUMENTS

| | | | |
|---|---|---|---|
| 5,127,066 | 6/1992 | Poggialini | 385/24 |
| 5,136,666 | 8/1992 | Anderson et al. | 385/24 |
| 5,206,924 | 4/1993 | Kersey | 385/24 |

FOREIGN PATENT DOCUMENTS

| | | |
|---|---|---|
| 0473121 | 3/1992 | European Pat. Off. . |
| 2176281 | 12/1986 | United Kingdom . |
| 2189028 | 10/1987 | United Kingdom . |

*Primary Examiner*—Rodney B. Bovernick
*Assistant Examiner*—Phan T. H. Palmer
*Attorney, Agent, or Firm*—Oblon, Spivak, McClelland, Maier & Neustadt

[57] ABSTRACT

A device for the optical processing of electrical signals. An optical source (L) emits a multiple-wavelength optical beam (B1). A modulator (MOD) modulates this beam. An optical fiber (F) receives the modulated beam and delays the components corresponding to the different wavelengths differently. A dispersive grating disperses wavelengths contained in the modulated beam in different directions. A spatial light modulator controls the level of optical intensity of different directions of the dispersed beam. An optical detection system receives the beam processed by the spatial light modulator. Such a device may find particular application to a transverse filter and microwave signal correlator.

22 Claims, 4 Drawing Sheets

DEVICE FOR THE OPTICAL PROCESSING OF ELECTRICAL SIGNALS

BACKGROUND OF THE INVENTION

The invention relates to a device for the optical processing of electrical signals, and notably to a device that can be applied as a transversal filter or as a correlator of microwave signals.

More particularly, the invention relates to a set of fiber-optic devices that enable the processing of very wideband microwave signals and that carry out notably matched filter and correlator functions. These devices use the chromatic dispersion properties of optical fibers as well as the possibility of permanently inducing Bragg gratings therein.

It is known in the prior art that a tranvserse filter carries out a summation of samples of a signal, taken at different instants, with a weighting relationship characteristic of the signal to be filtered. Such a filter is used to determine, for example, the date of appearance of a signal p(t) of which there is a priori knowledge. This transient signal p(t) with a finite duration T is mixed with a noise b(t) that is independent of p(t). It is therefore the signal $x(t)=p(t)+b(t)$ that has to be filtered. If such a filter maximizes the signal-to-noise ratio at the instant T, it is said to be matched. In the event of an ideal white noise, the pulse response h(t) of the matched filter is $h(t)=p(-t)$: when the noise is not white, this filter is no longer optimal but makes it possible, however, to determine the date of appearance in most cases.

The weighting method described in the document by J. Max, *Methodes et techniques du traitement du signal et applications aux mesures physiques* ("Signal Processing Methods And Techniques And Applications To Physical Measurement"), Masson, 1987 is an exemplary embodiment of such a filter. As shown in FIG. 1, the signal x(t) feeds a delay line constituted by N elements, each giving a delay T. Furthermore, there is a sampling on N+1 points of the signal p(t): p(0), p(τ), . . . p(Nτ). The signal coming from each element constituting the delay line is weighted by a coefficient $\lambda_k$ such that:

$$\lambda_K=P((N-k)\tau)/|Pmax|$$

where $|P_{max}|$ is the maximum value of the modulus of p(t). At the instant $t_0$, the sum $y(t_0)$ of the N+1 weighted outputs is equal to:

$$y(t_o) = \sum_{k=0}^{N} x(t_o - k\tau)p((N-k)\tau)$$

$$\text{with } N\tau = T$$

$$y(tO) = \sum_{k=0}^{N} x(t_k)p(t_k - (t_o - T)) \text{ with } t_k = t_o - k\tau$$

This is really the result of the matched filtering at the instant $t_0-T$. This function is presently carried out by means of digital electronic devices, but is limited in frequency and cannot be used for the direct processing of signals at frequencies of the order of 20 GHz. Other approaches, which are analog approaches in this case, based on microwave guides or optical fibers such as those described in K. P. Jackson and J. J. Schaw, "Fiber-Optic Delay Line Signal Processors" in J. L. Horner ed. "Optical Signal Processing", *Academic Press,* make it possible to envisage attaining this frequency range, but they come up against the difficulty of making a large number of coupling points.

The invention relates to a device that can be used to obtain a large number of samples on very high frequency signals, typically $n\approx 1024$ from 0 to 20 GHz.

Furthermore, it is often necessary in signal processing to compute the correlation product:

$$C(t_o) = \frac{1}{b}\int_T R(t-t_o)S(t)dt$$

where $R(t-t_0)$ is an appropriately delayed reference signal,

S(t) is the signal to be correlated,

T is the integration time, b is the noise equivalent power per Hz.

The object of this computation is to determine the value of $t_0$ that ensures the maximum of the correlation function $C(t_0)$. It is thus necessary to have available a large number of samples of the reference signal delayed by different values of $t_0$ in order to enable the precise determining of the value of $t_0$ that maximizes $C(t_0)$. A function such as this can be obtained electronically, but it is limited to signals for which the frequency and the passband do not exceed some 100 MHz. This limitation is due to excessively slow sampling and to excessively low memory capacities.

Devices based on optical fibers, carrying out the correlation of two optically conveyed signals, have already been proposed (see for example, the French patent applications Nos. 87 10120 and 91 12040).

SUMMARY OF THE INVENTION

The correlator that is an object of the invention has the advantage of not necessitating any temporal returning of one of the two signals, and it uses a photodetector with a reduced passband.

The invention therefore relates to a device for the optical processing of electrical signals, comprising:

an optical source emitting a multiple-wavelength optical beam;

at least one electrooptical modulator receiving the beam and modulating it by means of an electrical signal to be processed;

a dispersive optical fiber receiving the modulated beam and transmitting a beam in which the components corresponding to the different wavelengths are delayed with respect to one another in the fiber;

a dispersive grating separating the different wavelengths contained in the beam received from the optical fiber and giving a dispersed beam in which each wavelength is deflected in a direction that is characteristic of it;

a spatial light modulator comprising a plurality of modulation elements receiving the dispersed beam and controlling the level of optical intensity of different directions of the dispersed beam;

a system of optical detection (PD) receiving the beam processed by the spatial light modulator.

BRIEF DESCRIPTION OF THE DRAWINGS

The different objects and features of the invention shall appear from the following description and from the appended figures, of which.

DETAILED DESCRIPTION OF THE INVENTION

Figure 2:
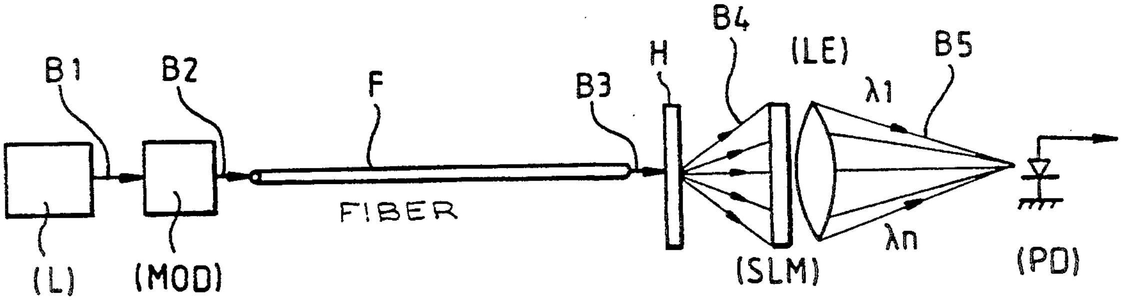
FIG. 2 shows a general theoretical diagram of a transverse filter according to the invention.

Referring to FIG. 2, a description shall be given of an exemplary embodiment of the invention.

This device comprises the following in series: a laser L, an electrooptical modulator MOD, an optic fiber F, a dispersive grating H or wavelength dispersive device, a spatial light modulator SLM, a lens (LE), a photodetector PD.

The laser L gives a multiple-wavelength beam B1 with wavelengths $\lambda_1, \ldots \lambda_N$. It is, for example, a diode-pumped solid-state laser delivering a continuous wideband spectrum or a substantial set of longitudinal modes. This beam is coupled in the modulator MOD. This modulator is, for example, an integrated modulator on $LiNbO_3$ or on a semiconductor. It has a passband extending between two frequencies $F_1$ and $F_2$ (for example $F_1=0$, $F_2=20$ GHz) and is excited by a signal x(t) to be processed.

Thus, in the beam B2, there is a multiple-wavelength optical carrier of the signal to be processed. In fact, each wavelength $\lambda_1$ to $\lambda_N$ may be considered to be an independent carrier of the signal x(t).

The beam B2 coming from the modulator MOD is coupled in the monomode optical fiber F, used in the spectral domain where it is dispersive, i.e. where the refraction index n of the fiber depends on the wavelength. The beam B3 coming from the optical fiber F has the different wavelengths delivered by the source L, all modulated by the modulator MOD, but these different wavelengths undergo different delays when crossing the fiber because of a different refraction index n for each wavelength.

The beam B3 then encounters the dispersive grating H, working for example in transmission. This grating H spatially separates the different components of wavelengths of the optic carrier. Each component then goes through an element of the spatial light modulator SLM. The transmission of each element of the modulator is variable as a function of the voltage applied to it and thus enables the application of the desired weighting to each component. An optical system LE then carries out the summation of all the components on a single photodetector PD.

At the instant $t_0$, the intensity of the optical carrier on each channel, before the crossing of the modulator SLM, has the form:

$$I_k(t_o) = S_o + S_1 \cdot x\left(t_o - l\frac{n_k}{c}\right)$$

where:

C is the velocity of light;

$S_0$ and $S_1$ are values of luminous intensities such that $S_0 > S_1 |x_{max}|$ $n_k$ is the refraction index of the fiber at the wavelength $\lambda_k$.

During the crossing of SLM, each channel is assigned a coefficient $\alpha_k$ characteristic of the signal to be detected in x(t) and becomes:

$$I'_k(t_o) = S_o \cdot \alpha_k + S_1 \cdot \alpha_k \cdot x\left(t_o - \frac{l n_k}{c}\right)$$

Since the optical summation is incoherent, the photodiode PD delivers a photocurrent that is proportional to the sum:

$$y(t_O) = \sum_{k=1}^{N} S_o \cdot \alpha_k + \sum_{k=1}^{N} S_1 \cdot \alpha_k \cdot x\left(t_o - \frac{l n_k}{c}\right) = y_o + y_1(t_o)$$

The first term $Y_0$ represents a constant slant while the second term $Y_1(t_0)$ is the result of the matched filtering of x(t).

An exemplary embodiment of the system and of its performance characteristics shall now be given:

Laser L: diode-pumped solid-state laser emitting on $\Delta\lambda$-100 nm between 800 and 900 nm, power value $P_0 \approx 20$ mW.

Modulator MOD: optical modulator integrated on $LiNbO_3$ wide passband 0→20 GHz modulation depth 80 to 100% insertion losses: 6 dB.

Figure 1:
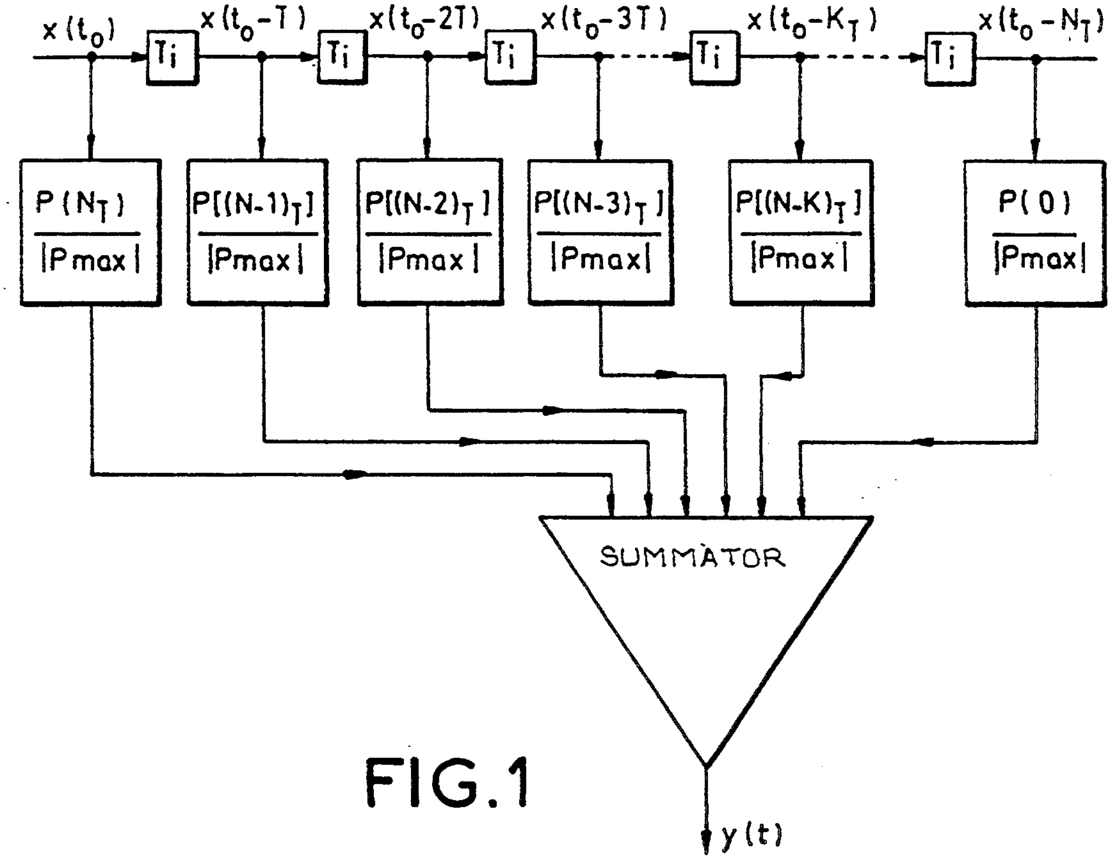
FIG. 1 shows a general theoretical diagram of a transverse filter.
Figure 3:
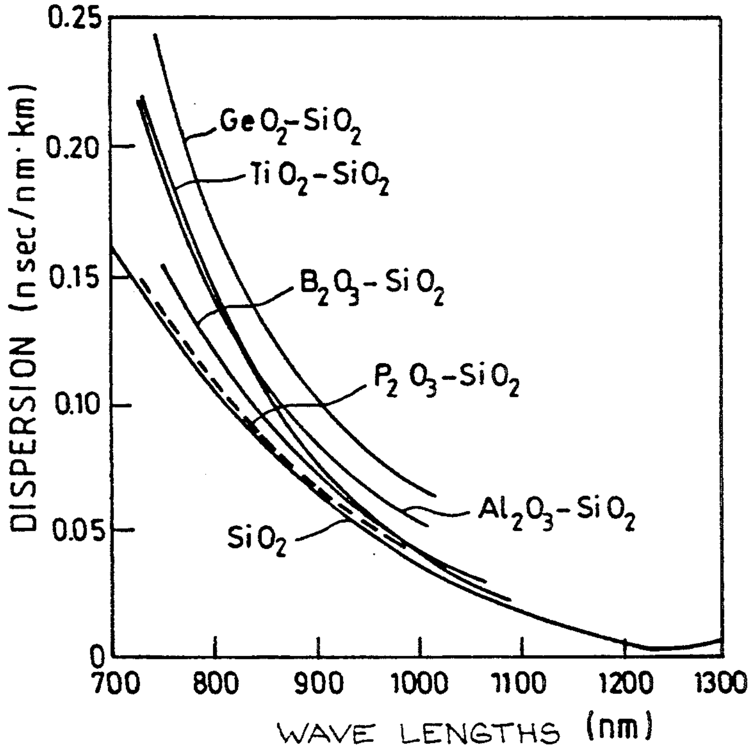
FIG. 3 shows curves of the chromatic dispersion of optical fibers.

Fiber: Monomode, silicon fiber for which an example of dispersion curves is shown in FIG. 3. It can be seen in these curves that a pure silica fiber is less dispersive than a silica fiber comprising another constituent element.

Thus, it is possible to match the dispersion of the fiber to the desired delay values.

Dispersive grating H: this grating commonly permits a resolution of 0.1 nm.;

Spatial light modulator SLM: spatial modulator with a dimension of $10^3$ pixels: liquid crystal cell having a dynamic range of 20 to 30 dB. Transmission≈50%.

Optical detector PD: fast photodiode whose minimum detectable power is typically in the range of $P_1 \approx 10^{-13}\sqrt{B}$ where B is its operating passband; for a passband Δf, the delay increment T should be at most:

$$\lambda = \tfrac{1}{2} . \Delta F$$

Thus the fiber length l that can be used to make a device with N channels is determined by:

$$N \cdot \tau = \frac{l}{c}\left(n_{\lambda N} - n_{\lambda 1}\right) = \frac{l}{c}\,\Delta n$$

whence:

$$l = \frac{c}{\Delta n} \cdot \frac{N}{2 \cdot \Delta f}$$

For a silica fiber, used between 800 and 900 nm, we have:

$$\Delta n \sim 2.10^{-3}$$

whence if:

$$N = 10^3, \Delta F = 20 \text{ GHz}$$

$$l = 3,8 \text{ km}$$

A fiber length such as this, at these wavelengths, introduces optical transmission losses of the order of 8 dB (2 dB/km).

Furthermore, the passband of the photodiode should be of the order of $\Delta F/N$. If $P_1$ is the minimum power detectable by this photodiode, it should meet the following relationship:

$$P_1 \leqq P_O \cdot T \cdot \frac{1}{N} \cdot \frac{1}{D}$$

where T is the total optical transmission of the device and D is the dynamic range permitted by SLM. In the example given:

$$\Delta F/N \sim 20 \text{ MHz}$$

whence:

$$P_1 \sim 10^{-13}\sqrt{\Delta f/N} = 4 \cdot 10^{-10}\ W et P_O \geqq 20 \text{ mW}$$

The device thus described finds preferred application as a transverse filter and procures the following advantages:

This system makes it possible to carry out the matched filtering, without frequency transposition, of very high frequency and wide passband signals. Indeed, the delay increment may be as low as desired: to this end, it is enough to use the optic fiber on a spectral domain where its chromatic dispersion is low or to match the nature of the fiber to the desired increment;

The weighting $\alpha_k$ is controlled in parallel by means of a single device SLM. This device is activated by low voltages and ensures the reconfigurability of the system at all times.

The independent control, on each channel, of the transmission from the spatial modulator SLM enables compensating for the non-uniformities of the spectrum sent out by the laser as well as those due to the transmission of the fiber.

The volume of the device ought to be small and not greater than one liter. Furthermore, its consumption will remain limited, given the output values of currently used sources.

Figure 4:
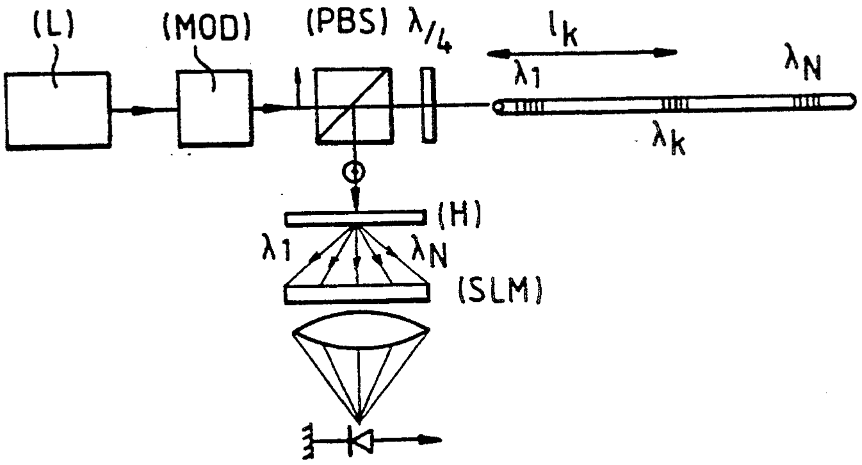
FIG. 4 shows an alternative embodiment of a transverse filter according to the invention.

Referring to FIG. 4, a description shall now be given of a variant of the device of FIG. 2.

In this variant, the optical fiber is no longer used as a dispersive medium. On the contrary, it is used at a wavelength for which the dispersion is the minimum.

Bragg gratings, matched to the wavelengths $\lambda_1, \lambda_2 \ldots \lambda_n$, working in reflection, are photoinduced in the fiber. The matching of the Bragg grating to the different wavelengths is obtained by variation of the period of the photoinduced grating. The method of recording is similar to the one described, for example, in G. Meltz, W. W. Morey, W. H. Glenn, "Formation Of Bragg Gratings In Optical Fibers By A Transvese Holographic Method", Opt. Lett., 4, 823 (1989) and uses a UV laser ensuring the permanence of the gratings.

The laser source L sends out an extended spectrum $\Delta\lambda$, containing wavelengths $\lambda_1 \ldots \lambda_N$. Furthermore, the beam B1 that comes therefrom is linearly polarized. It is then coupled in the modulator MOD, identical to the one described further above, excited by the microwave signal x(t) to be filtered. This multiple-frequency optical carrier is then coupled in the fiber provided with gratings, where each component will undergo a reflection at a different abscissa value. This fiber is a polarization-maintaining fiber so that it can easily separate the incident beams and the reflected beams.

The achromatic quarter-wave plate $\lambda/4$ and the polarization separator PBS (polarization separator cube) enables the collection of the light reflected by the fiber F. The dispersion/weighting/summation system remains identical to the one described here above. Thus, the intensity of the optical carrier, after the crossing of the modulator SLM, has the form:

$$I_k(t_o) = S_o \cdot \alpha_k + S_1 \cdot \alpha_k \cdot x\left(t_o - \frac{2n}{c} l_k\right)$$

where:

n is the refraction index of the fiber;

$l_k$ is the position, in the fiber, of the grating matched with $\lambda_k$. In a manner that is identical to the foregoing one, the coherent summation on the photodiode gives a photocurrent that takes account of the matched filtering of x(t). In order to make a precise definition of the temporal sample taken, it is necessary for the thickness of each grating to be small in comparison with the wavelength of the signal to be processed.

If $\Delta f$ is the passband to be processed and 1 is the total length of the fiber, then:

$$\tau = 1/2\Delta f$$

$$2(l_{k+1} - l_k) = \frac{c}{n}\tau$$

$$l = N \cdot \frac{c}{2n} \cdot \frac{1}{2\Delta f}$$

Thus, for the application described here above, there will be, for example:

$$l_{k+1} - l_k = 2,5 \text{ mm}$$

$$l = 2,5 \text{ m}$$

coefficient of the gratings $= 250\ \mu$m.

thickness of reflection of each grating $= 10\%$

The foregoing dimensioning of the device remains valid since the losses by transmission in the fiber are replaced by the efficiency, in reflection, of the gratings.

Figure 8:
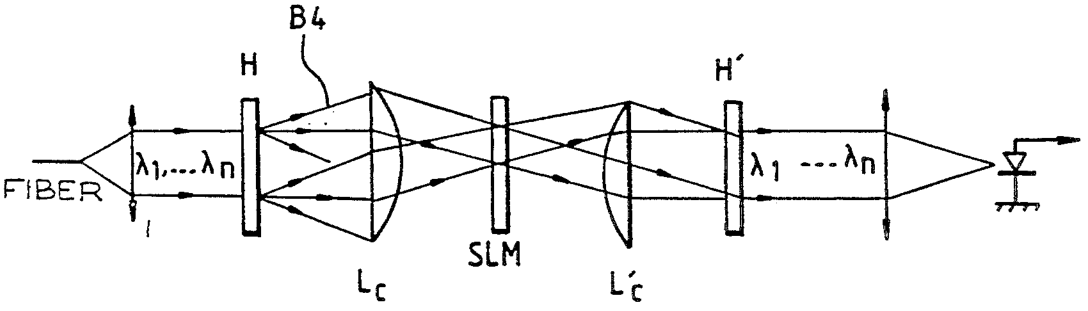
FIG. 8 shows an alternative embodiment that can be applied to the different devices of FIGS. 2 to 7.

FIG. 8 shows another alternative embodiment wherein, when the divergence of the multiple-frequency beam B4 is far too great in relation to the size of the pixels of the modulator SLM or when a very compact system is desired, it is advantageous to implement the symmetrical system of FIG. 8.

$L_c$ and $L'_c$ are symmetrical lenses, for example having the same focal length. In this case, H and H' are similar gratings. All the wavelengths are thus recombined in a single direction before being summed up by means of the output lens. The SLM pixels have the dimensions of the luminous lines formed by $L_c$.

According to another variant, the output spherical lens and the single detector of FIG. 8 are replaced respectively by a cylindrical lens, parallel to Lc, and by an array of photodiodes. Furthermore, SLM becomes a 2D spatial light modulator (with N×p pixels). Each line of the SLM has q independently addressable pixels. An element of the array of photodiodes is associated with each pixel. The system thus makes it possible, in parallel, to carry out the matched filtering with q different signals capable of being contained in the signal x(t).

The device of the invention is also applicable to a correlator of electrical signals (notably microwave signals).

Figure 5:
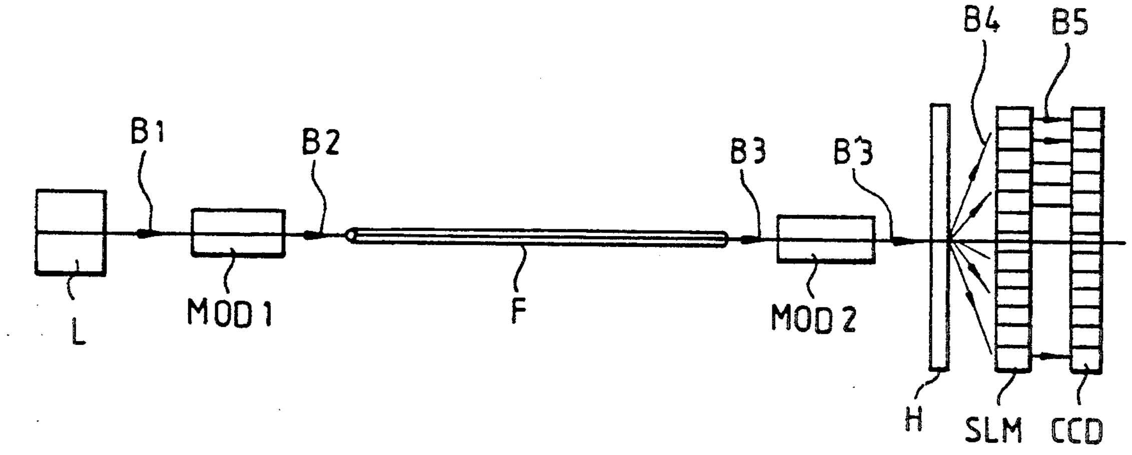
FIG. 5 shows an exemplary embodiment of a correlator of microwave signals according to the invention.

FIG. 5 shows an example of a correlator such as this according to the invention. This correlator comprises the following in series:

an optical source (laser) L,
a first electrooptical modulator MOD1
a dispersive optical fiber F
a second electrooptical modulator MOD2
a dispersive grating H
a spatial light modulator SLM
an CCD optical detection device referenced CCD.

The different elements of this correlator have characteristics similar to those of the device described here above. It is specified that the optical detection device CCD may comprise as many elementary detectors as there are pixels and that these detectors are coupled to a charge-coupled device.

The role of this device is to correlate two electrical signals S(t) and R(t). The first electrooptical modulator MOD1 uses the signal S(t) to modulate the beam B1. The second electrooptical modulator MOD2 uses the signal R(t) to modulate the beam B3 coming from the fiber F.

The beam B3, as has been seen here above, is constituted by a plurality of elementary beams that have different optical wavelengths and have undergone different delays in the optical fiber F. The modulator MOD2 therefore applies a modulation to each of these elementary beams. This means, therefore, that each of these elementary beams has an amplitude proportional to the product of the modulations S(t) and R(t), obtained at different instants for each of these elementary beams.

The dispersive grating H achieves a spatial distribution of the components of the beam B'3, each corresponding to a wavelength (or a narrow range of wavelengths). The different elementary beams of the beam B4 are modulated by the spatial light modulator SLM, then transmitted to the CCD photodetectors referenced CCD. The role of the modulator SLM is to correct the dispersions of the source L as well as of the transmission system (fibers notably). However, according to one alternative embodiment, it is possible for the modulator SLM not to exist, and this correction can be done at the detection on the CCD detector referenced CCD or at the processing of the signal detected by the CCD detector.

At the instant t, on each photodetector element of the CCD, the amplitude of the incident optical beam at the wavelength $\lambda_k$ is proportional to:

$$I_k(t) = I_{o,k}\left(1 + m_1 \cdot m_2 \cdot S\left(t - \frac{ln_k}{c}\right)R(t)\right)$$

$I_{o,k}$ is the intensity of the beam at $\lambda_k$ received by the photodetector element when there is no modulation;

$m_1$ and $m_2$ are the depths of modulation of the optical signal obtained on $mod_1$ and $mod_2$.

It is recalled that the total passband of the system is ΔF and that the number of samples of the correlation signal is N. In this case, the passband of each element of the CCD is of the order of Δf/N. Thus, the integration time on each element of the CCD is equal to: $T=N/2\Delta F$.

Thus, the photocurrent delivered by each element k of the CCD is proportional:

$$i_k(t): \langle I_k(t)\rangle\, T =$$

$$i_{k,o} \times T + m_1 \cdot m_2 I_{k,o} \int_T S\left(t - \frac{ln_k}{c}\right)R(t)dt$$

and takes proper account, in its modulated part, of the product of correlation S(t)*R(t).

Similarly for the transverse filter, if $\Delta F = 20$ GHz and $N = 10^3$, we have $$l \approx 4 \text{ km}$$

and $$P_O \geqq P_1 \frac{1}{T} \cdot N \cdot D$$

where $P_1$ is typically equal to $10^{-10}$ W (detectivity of the CCD of the order of $3.10^{-2}$ pW/H$2^{1/2}$).

$$D \approx 40 \text{ dB}$$

and therefore $P_0 > 60$ mW

This device procures the same advantages as the devices of FIGS. 2 and 4 and enables an optically coherent detection on each element of the CCD.

Figure 6:
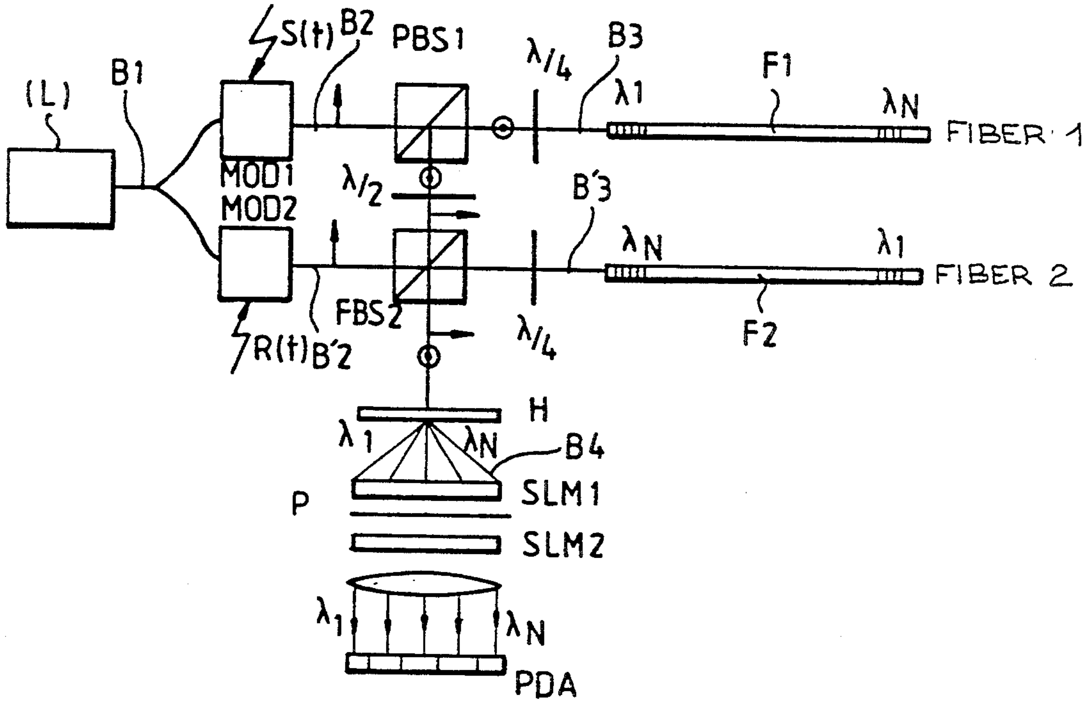
FIG. 6 shows another exemplary embodiment of a correlator of microwave signals according to the invention.

FIG. 6 shows an alternative embodiment of the correlator of the invention.

The laser L, emitting on a wide spectrum Δλ, is coupled to two modulators MOD1 and MOD2 as described here above (.F−20 GHz). They are respectively excited by the signals S(t) and R(t). The beams coming from these modulators are linearly polarized and pass through polarization separators or polarization separator cubes $PBS_1$ and $PBS_2$. They are then coupled in two polarization-maintaining optical fibers F1, F2 of the same length 1 in which there have been photoinduced gratings identical to those described here above. In the fiber F1, the gratings are positioned so as to reflect successively $\lambda_1$ then $\lambda_2, \ldots \lambda_N$. The order is reversed in the fiber F2. After reflection, the different components of the optical carriers S(t) and R(t) go again through the λ/4 plates and are perfectly reflected by $PBS_1$ and $PBS_2$. The beam reflected by $PBS_1$ undergoes a polarization rotation of 90° and goes through $PBS_2$. Thus, the carriers of the signals R(t) and S(t) are superimposed at the end of $PBS_2$ and their polarizations are crossed. This double beam then goes through a dispersive grating H where the different wavelengths are spatially dispersed. Each of them goes through a first spatial light modulator $SLM_1$. This spatial light modulator $SLM_1$ is for example a liquid crystal cell operating by electrically controlled birefringence. The polarization coincides, for example, with the optical axis of the liquid crystal molecules. Thus, the refraction index experienced by this polarization varies, depending on the voltage applied to the pixel, between between $n_o$ and $n_e$ (ordinary and extraordinary indices of the liquid crystal). On the contrary, the polarization experiences a constant refraction index n0. $SLM_1$ and therefore makes it possible to control the relative phase shift of the carriers of S(t) and R(t). A polarizer P, oriented by 45° with respect to the orthogonal directions of polarization, enables the recombination of these two polarizations. A second spatial modulator $SLM_2$ attached to the first one and comprisng the same number of pixels, makes it possible to control the weights $\alpha_k$ assigned to each wavelength component channel. At an output of this device, an optical system enables the focusing of each channel on one of the elements of a CCD type multiple photodetector PDA. Thus, after integration, each pixel of the CCD delivers a signal proportional to the correlation product S(t)*R(t).

Indeed:

at the input of these fibers, the electrical field associated with the two waves coming from $mod_1$ and $mod_2$ have the form:

$$E_Z(Z,t) = E_{10}\sqrt{S(t)}\ \exp(j\omega t)$$

$$E_Z(Z,t) = E_{20}\sqrt{R(t)}\ \exp(j\omega t)$$

on the element 1 of the multiple photodetector, the incident electrical fields have become:

$$E_1^i(t) = \alpha_i E_{10}^i \sqrt{S\left(t - \frac{2li}{v}\right)}\ \exp\left(j\omega_i\left(t - \frac{2li}{v}\right) + \phi_i\right)$$

$$E_2^i(t) = \alpha_i E_{20}^i \sqrt{R\left[t - 2\left(\frac{L-li}{v}\right)\right]}\ \exp\left(j\cdot \omega_i\cdot\left(t - 2\left(\frac{L-li}{v}\right)\right)\right)$$

where:

v: is the velocity of light in the fiber (Δλ is chosen in the vicinity of a minimum of dispersion of the fiber and hence $v_1 = C/n_i = v = cst$);

L: the total length of the two fibers;

$I_F$: the position of the grating reflecting $\lambda_i$ in the fiber 2;

$w_i$: the pulsation associated with the length $\lambda_i$;

$\psi_i$: the relative phase-shift introduced by $SLM_1$ between the two components at $\lambda_i$ that interfere on the photodetector i.

In this case, for an integration time T, the photocurrent delivered by the photodetector 1 is proportional to:

$$i_i(t)\alpha < |E_1^i(t) + E_2^i(t)|^2 > T = |E_{10}^i|\alpha_i^2 \int_T S\left(t - \frac{2li}{v}\right)dt + |E_{20}^i|\alpha_i^2 \int_T R\left(t - 2\left(\frac{L-li}{v}\right)\right)dt + 2E_{10}^i E_{20}^i \alpha_i \cos\left(\omega_i\cdot 2\left(\frac{L-2li}{v}\right) - \phi_i\right)\int_T \sqrt{S\left(t-\frac{2li}{v}\right)R\left(t - 2\frac{L-li}{v}\right)}\,dt$$

On each channel, the phase-shift $\psi_1$ is adjusted so that:

$$2\omega_i\frac{L-2li}{v} - \phi_i = 2K\pi(K\epsilon N)$$

Thus, the optical path fluctuations are compensated for by means of $SLM_1$. In the expression $i_1(t)$ there are thus recovered two first terms that constitute a slant and a third term that takes account of the correlation product S(t)*R(t).

Hereinafter, an exemplary embodiment of the system and its expected dimensions are described. The total passband of the system is .F. The number of channels or samples of the signal is N.

In this case, the integration time is equal at least to:

$$T = \frac{1}{2\Delta f}\cdot N$$

Similarly, for the transverse filter:

$$l_{i+1} - l_i = \frac{c}{2n}\cdot\frac{T}{N}$$

$$L = N\cdot\frac{C}{2n}\cdot\frac{1}{2\Delta f}$$

Thus, if:

$\Delta f = 20$ GHz and $N = 10^3$ $T = 25$ ns $l_{i+1} - l_i = 2{,}5$ mm $L = 2{,}5$ m.

If $P_o$ is the optical power available at output of the laser source, the maximum total optical power received on a channel is of the order of:

$$P_O\cdot T_{mod}\cdot\eta_i\cdot\eta_H\cdot T_{SLM1}\cdot T_{SLM2}\cdot\frac{1}{N}$$

where:

Tmod1: loss of insertion of the modulators (≈6 dB)

$\eta_i$: coefficient of reflection at $_i$ of the photoinduced grating ($\approx 10\%$)

$\eta_h$: diffraction efficiency of the dispersive grating $T_{slmk}$: transmission coefficient of the spatial modulators ($T_{SLM1} \approx 90\%$, $T_{SLM2} \approx 50\%$)

Furthermore, a CCD pixel for an integration time of 1 ms enables the detection of 1 pW, giving a detectivity of the order of $3.10^{-2}$ pW/H2½. For an integration time T, the NEP (noise equivalent power) that corresponds to the smallest detectable power, therefore becomes:

$$
\begin{aligned}
NEP &= 3.10^{-14}\sqrt{1/2T}\ \text{W} \\
&= 1.4 \cdot 10^{-10} W \\
&= \text{minimum power detectable by channel}
\end{aligned}
$$

=minimum power detectable by channel (The duration of the integration is not, in this case, the optimum since it is well below the duration of the reading of the CCD array (reading frequency $\approx$20 MHz for $10^3$ pixels)).

If the dynamic range of the system is to be D, it is then necessary to have:

$$
P_O T_{mod} \eta_i \eta_H T_{SLM1} T_{SLM2} \frac{1}{N} \geqq D \cdot NEP
$$

Whence herein $P_o$ > 140 mW (for D=40 dB) which is a power value compatible with the presently used diode-pumped, solid-state laser sources. It must be noted, however, that it is necessary, for each \ $_i$, to have available a coherence length greater than 2L in order to obtain the correlation product. Thus, in the above-described example (L=2.5 m), each $W_i$ is defined to a precision of closer than 60 MHz. It therefore seems to be more realistic for this application to use a set of multidiode laser sources.

This correlator according to the invention has the same advantages as those indicated here above for the filtering device. Indeed:

the correlation requires no transposition of frequencies of the signals S(t), R(t);

the weighting checks of the different components of the beam B5 can be reconfigured at all times;

the non-uniformity of the spectrum of the source L and of the transmission (of the fiber or fibers notably) may be corrected by the spatial light modulator SLM.

Figure 7:
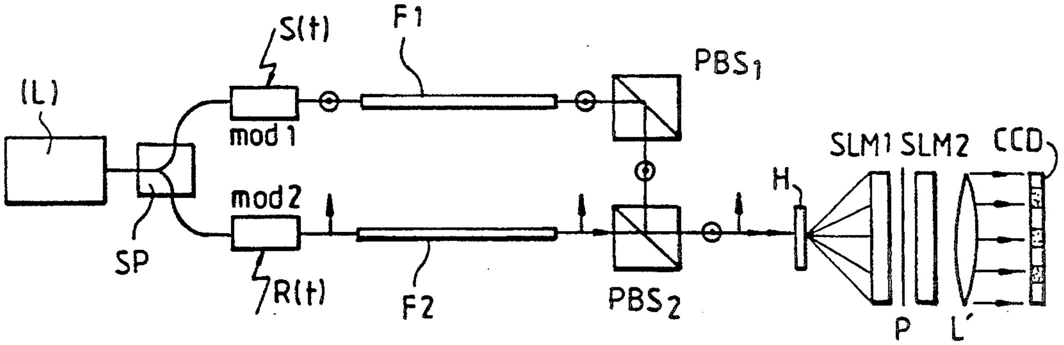
FIG. 7 shows an alternative embodiment of the correlator of FIG. 6.

FIG. 7 shows an alternative embodiment of the device of FIG. 6. According to this variant, the fiber F1 has a chromatic dispersion on a range of optical wavelength Δλ. In the same range, the fiber F2 is almost free of dispersion.

The device PSB1 located at output of the fiber F1 is actually a reflection device. The device PSB2 located at output of the fiber F2 is used to combine the beams coming from the fibers F1 and F2. For example, in FIG. 7, the device SP located at the inputs of the fibers F1, F2 is a polarization separator. However, the beams transmitted to the fibers F1, F2 could also have the same direction of polarization and the device SP could be a light separator.

As noted above, the superimposed beams coming from the fibers F1, F2 are transmitted by the dispersive grating H and the spatial light modulators SLM1 and SLM2 to the CCD optical detection device referenced CCD.

In each CCD detector element, there is thus the product:

$$
\int_T \sqrt{S\left(t - \frac{ln_i}{C}\right) R\left(t - \frac{Ln}{C}\right)}\, dt
$$

namely $$
\int_T \sqrt{S(t') R\left(t' - \frac{L}{C}(n - n_i)\right)}\, dt'
$$

A description shall now be given of the alternative embodiments that are generally applicable to the different devices described here above.

According to a first variant, the single laser source L is replaced after a set of p sources, each emitting a spectrum Δλ/p. In this case, a coupler px1 is used to combine the p sources in a single fiber pigtail connected to the modulator mod. It is possible, for example, for N=1024, to use 64 semiconductor lasers of some mW, each emitting 16 longitudinal modes at distances of 0.1 nm from one another.

What is claimed is:

1. A device for the optical processing of electrical signals, comprising:

an optical source emitting a multiple-wavelength optical beam;

at least one first electrooptical modulator receiving the optical beam and modulating it by means of a first electrical signal to be processed to give a first modulated beam;

at least one first optical fiber receiving the modulated beam and incorporating spatial separation means that enable the transmission of a beam in which the components corresponding to the different wavelengths are delayed with respect to one another in the fiber;

a dispersive grating separating the different wavelengths contained in the beam received from the optical fiber and giving a dispersed beam in which each wavelength is deflected in a direction that is characteristic of it;

a reconfigurable spatial light modulator comprising a plurality of modulation elements., each of the plurality of modulation elements receiving at least one component of the dispersed beam and controlling the level of optical intensity of different directions of the respective at least one component of the dispersed beam; and an optical detection system receiving the beam processed by the spatial light modulator.

2. A device according to claim 1, comprising a focusing device between the spatial light modulator and the optical detection system to focus the beam processed by the modulator on the optical detection system.

3. A device according to claim 1, wherein the optical fiber is a dispersive optical fiber.

4. A device according to claim 1, wherein the spatial separation means comprise Bragg gratings recorded in the optical fiber, each Bragg grating having a pitch determined so as to reflect the light of a determined wavelength; and wherein the device further comprises, between the modulator and the optical fiber, a beam separator that can be used to transmit the light reflected by the Bragg gratings to the dispersive grating.

5. A device according to claim 4, wherein the light transmitted by the modulator is polarized in one direction and wherein the device comprises, between the beam separator and the optical fiber, a quarter-wave plate, the beam separator being then a polarization separator.

6. A device according to claim 1, wherein the optical detection system is an optical photodetector and wherein the device comprises a focusing device located between the spatial light modulator and the optical detection system.

7. A device according to claim 1, comprising a first cylindrical lens between the dispersive grating and the spatial light modulator as well as a second cylindrical lens that is symmetrical to the first cylindrical lens in relation to a spatial modulator, and a second dispersive grating that is symmetrical to the first dispersive grating in relation to the spatial modulator.

8. A device according to claim 7, wherein the optical detection system is a line of photodetectors and wherein the device comprises a third cylindrical lens included between the spatial light modulator and the optical detection system.

9. A device according to claim 1, comprising a second electrooptical modulator also receiving the multiple-wavelength optical beam and modulating it by means of a second electrical signal to be processed to give a second modulated beam, this second modulated beam being superimposed on the first modulated beam before transmission to the dispersive grating.

10. A device according to claim 9, wherein the second electrooptical modulator is located between the optical fiber and the dispersive grating.

11. A device according to claim 9, wherein the second electrooptical modulator receives, in parallel with the first electrooptical modulator, the multiple-wavelength optical beam and wherein it transmits it to a second optical fiber also comprising means that enable the different wavelengths to be delayed in different ways; the beams coming from the two optical fibers being transmitted to a coupling system that combines them and retransmits them to the dispersive grating.

12. A device according to claim 9, wherein the first and second optical fibers comprise Bragg gratings, each Bragg grating having a pitch determined so as to reflect the light of a determined wavelength; and wherein the device further comprises between the modulators and the optical fibers, beam separators enabling the transmission of the light reflected by the Bragg gratings to the dispersive grating.

13. A device according to claim 12, wherein the light transmitted by the modulators is polarized in one direction and wherein the device comprises a quarter-wave plate located between the beam separators and the fibers, the beam separators then being polarization separators.

14. A device for the optical processing of electrical signals, comprising:

an optical source emitting a multiple-wavelength optical beam;

at least one first electrooptical modulator receiving the optical beam and modulating it by means of a first electrical signal to be processed to give a first modulated beam;

at least one first optical fiber receiving the modulated beam and incorporating spatial separation means that enable the transmission of a beam in which the components corresponding to the different wavelengths are delayed with respect to one another in the fiber, the spatial separation means comprising Bragg gratings recorded in the optical fiber, each Bragg grating having a pitch determined so as to reflect the light of a determined wavelength;

a beam separator formed between the at least one electrooptical modulator and at least one first optical fiber, the beam separator transmitting light reflected by the Bragg gratings;

a dispersive grating separating the different wavelengths contained in the beam received from the beam separator and giving a dispersed beam in which each wavelength is deflected in a direction that is characteristic of it;

a reconfigurable spatial light modulator comprising a plurality of modulation elements receiving the dispersed beam and controlling the level of optical intensity of different directions of the dispersed beam; and an optical detection system receiving the beam processed by the spatial light modulator.

15. A device according to claim 14, wherein the light transmitted by the modulator is polarized in one direction and wherein the device further comprises, between the beam separator and the optical fiber, a quarter-wave plate, the beam separator being then a polarization separator.

16. A device for the optical processing of electrical signals, comprising:

an optical source emitting a multiple-wavelength optical beam;

at least one first electrooptical modulator receiving the optical beam and modulating it by means of a first electrical signal to be processed to give a first modulated beam;

at least one first optical fiber receiving the modulated beam and incorporating spatial separation means that enable the transmission of a beam in which the components corresponding to the different wavelengths are delayed with respect to one another in the fiber;

a first dispersive grating separating the different wavelengths contained in the beam received from the optical fiber and giving a dispersed beam in which each wavelength is deflected in a direction that is characteristic of it;

a first cylindrical lens for receiving the dispersed beam from the dispersive grating;

a reconfigurable spatial light modulator comprising a plurality of modulation elements receiving the dispersed beam through the first cylindrical lens and controlling the level of optical intensity of different directions of the dispersed beam;

a second cylindrical lens which is symmetrical to the first cylindrical lens in relation to the spatial light modulator;

a second dispersive grating which is symmetrical to the first dispersive grating in relation to the spatial light modulator; and an optical detection system receiving the beam processed by the spatial light modulator, and passing through the second cylindrical lens and second dispersive grating.

17. A device according to claim 16, wherein the optical detection system is a line of photodetectors and wherein the device comprises a third cylindrical lens included between the spatial light modulator and the optical detection system.

18. A device for the optical processing of electrical signals, comprising:

an optical source emitting a multiple-wavelength optical beam;

a first electrooptical modulator receiving the optical beam and modulating it by means of a first electrical signal to be processed to give a first modulated beam;

a second electrooptical modulator also receiving the optical beam and modulating it by means of a second electrical signal to be processed to give a second modulated beam, this second modulated beam being superimposed on the first modulated beam to generate a third modulated beam;

at least one first optical fiber receiving the third modulated beam and incorporating spatial separation means that enable the transmission of a beam in which the components corresponding to the different wavelengths are delayed with respect to one another in the fiber;

a dispersive grating separating the different wavelengths contained in the beam received from the optical fiber and giving a dispersed beam in which each wavelength is deflected in a direction that is characteristic of it;

a reconfigurable spatial light modulator comprising a plurality of modulation elements receiving the dispersed beam and controlling the level of optical intensity of different directions of the dispersed beam; and an optical detection system receiving the beam processed by the spatial light modulator.

19. A device according to claim 18, wherein the second electrooptical modulator is located between the optical fiber and the dispersive grating.

20. A device according to claim 18, wherein the second electrooptical modulator receives, in parallel with the first electrooptical modulator, the multiple-wavelength optical beam and wherein the second electrooptical modulator transmits the multiple-wavelength optical beam to a second optical fiber also comprising means that enable the different wavelengths to be delayed in different ways; the beams coming from the two optical fibers being transmitted to a coupling system that combines them and retransmits them to the dispersive grating.

21. A device according to claim 18, wherein the first and second optical fibers comprise Bragg gratings, each Bragg grating having a pitch determined so as to reflect the light of a determined wavelength; and wherein the device further comprises between the first and second modulators and the first and second optical fibers, beam separators enabling the transmission of the light reflected by the Bragg gratings to the dispersive grating.

22. A device according to claim 21, wherein the light transmitted by the first and second modulators is polarized in one direction and wherein the device comprises a quarter-wave plate located between the beam separators and the first and second fibers, the beam separators then being polarization separators.

* * * * *